(12) United States Patent
Chinn et al.

(10) Patent No.: US 7,527,775 B2
(45) Date of Patent: May 5, 2009

(54) CO₂ REMOVAL FROM GAS USING IONIC LIQUID ABSORBENTS

(75) Inventors: Daniel Chinn, Bay Point, CA (US); De Q. Vu, Bakersfield, CA (US); Michael S. Driver, San Francisco, CA (US); Laura C. Boudreau, Houston, TX (US)

(73) Assignee: Chevron U.S.A. Inc., San Ramon, CA (US)

( * ) Notice: Subject to any disclaimer, the term of this patent is extended or adjusted under 35 U.S.C. 154(b) by 617 days.

(21) Appl. No.: 11/408,294

(22) Filed: Apr. 20, 2006

(65) Prior Publication Data

US 2006/0251558 A1    Nov. 9, 2006

Related U.S. Application Data

(63) Continuation-in-part of application No. 10/737,090, filed on Dec. 16, 2003, now abandoned.

(51) Int. Cl.
*B01D 53/14* (2006.01)
(52) U.S. Cl. ...................................... 423/226; 423/220
(58) Field of Classification Search ................. 423/220, 423/226, 232
See application file for complete search history.

(56) References Cited

U.S. PATENT DOCUMENTS 4,100,099 A * 7/1978 Asperger et al. ............ 252/189
6,579,343 B2 * 6/2003 Brennecke et al. ............. 95/51

* cited by examiner

*Primary Examiner*—Edward M Johnson
(74) *Attorney, Agent, or Firm*—David M. Tuck

(57) ABSTRACT

A process and method for separating CO₂ from a gaseous stream such as natural gas. An ionic liquid comprising an anion having a carboxylate function and an effective amount of water is used as an adsorbent to selectively complex the CO₂ yielding a gaseous stream with a greatly reduced CO₂ content. The ionic liquid can then be readily be regenerated and recycled.

20 Claims, 10 Drawing Sheets

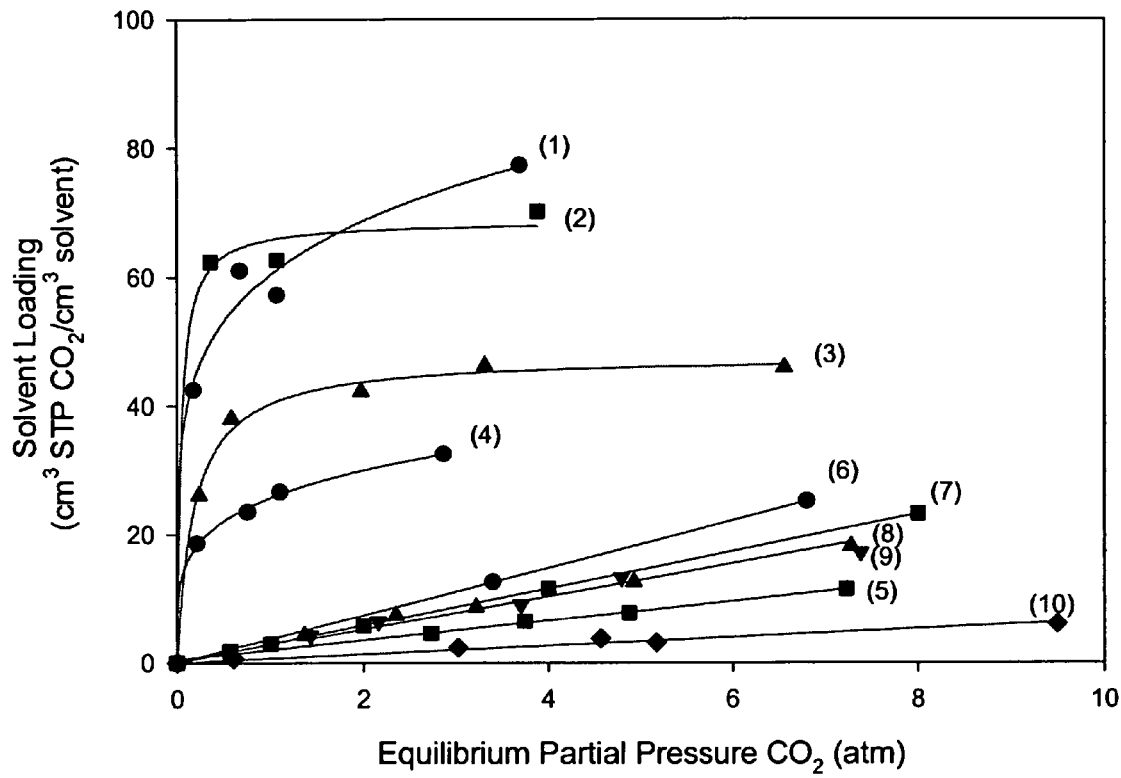

(1) 50 wt.% MDEA in water
(2) 30 wt.% MEA in water
(3) 15 wt.% MEA in water
(4) [bmim][acetate] with 14 wt.% water
(5) [bmim][$BF_4$] with 0.2 wt.% water
(6) Selexol, literature data. (Kohl, A.; Nielsen, R. Gas Purification, 5th edition. Gulf Publishing, Houston TX 1997. pp. 1189-1210).
(7) NAM, literature data. (Gross, M. et. al., Morphysorb: A New Solvent Process for Acid Gas Removal and its Impact on BTEX Emissions. 1999 Laurance Reid Gas Conditioning Conference Paper).
(8) NFM with 0.3 wt.% water
(9) 50:50 NAM-NFM blend with 3.0 wt.% water
(10) Water

Figure 2

(1) 50 wt.% MDEA in water (2) 30 wt.% MEA in water (3) 15 wt.% MEA in water (4) [bmim][acetate] with 14 wt.% water (5) Hybrid: 50 wt.% MDEA, 43 wt.% [bmim][acetate], 7 wt.% water (6) Hybrid: 30 wt.% MEA, 60 wt.% [bmim][acetate], 10 wt.% water ○ 50 wt.% MDEA in water
□ 30 wt.% MEA in water
△ 15 wt.% MEA in water
● [bmim][acetate] with 14 wt.% water
■ [bmim][$BF_4$] with 0.2 wt.% water
▽ NFM with 0.3 wt.% water
✕ 50:50 NAM-NFM Blend with 3 wt.% water
◇ Water
▲ Hybrid: 50 wt.% MDEA, 43 wt.% [bmim][acetate], 7 wt.% water
▼ Hybrid: 30 wt.% MEA, 60 wt.% [bmim][acetate], 10 wt.% water ○ 50 wt.% MDEA in water
● [bmim][acetate] with 14 wt.% water
▽ NFM with 0.3 wt.% water
◇ Water
▼ Hybrid: 30 wt.% MEA, 60 wt.% [bmim][acetate], 10 wt.% water

CO₂ REMOVAL FROM GAS USING IONIC LIQUID ABSORBENTS

CROSS REFERENCE TO RELATED APPLICATIONS

This application is a Continuation-in-Part of U.S. patent application Ser. No. 10/737,090 filed Dec. 16, 2003 which is incorporated by reference herein in its entirety.

BACKGROUND OF THE INVENTION

Carbon dioxide ($CO_2$) is an undesired diluent that is present in many natural gas and other gas sources. The removal of $CO_2$ is a common separation process in natural gas processing and is often required to improve the fuel quality (heating value) of the natural gas. Also, $CO_2$ in the presence of water can be a corrosive agent to metal pipes. As a consequence, the removal of $CO_2$ to acceptable specifications is required prior to transport natural gas or in pipelines. In the natural gas processing industry, various technologies have been employed for $CO_2$ removal including chemical solvents, physical solvents, and membranes. By far, chemical solvents that reversibly react with $CO_2$ are most commonly used for $CO_2$ removal. Commonly used chemical solvents comprise amine solutions. Commercial amine solutions useable for this purpose include monoethanolamine (MEA), N-methyldiethanolamine (MDEA), and diethanolamine (DEA). In this process, the amine solution (amine and water) circulate in a loop between two key steps: absorption of $CO_2$ and regeneration of the amine solvent. Although an effective $CO_2$ separation process, amine treating presents several issues and challenges:

1. Intensive energy requirements: During the regeneration step, heating energy is required to break the chemical bonds between the absorbed $CO_2$ and solvent. Energy is also required to generate steam within the amine regenerator to strip the $CO_2$ from the solvent. For some particularly strongly-absorbing amines (e.g., MEA) and for large circulation rates, this energy requirement can be very high and represents a significant operating expense. Due to the high energy requirements, $CO_2$-rich amine solutions are only partially regenerated to a lower $CO_2$ loading ($CO_2$-lean state) during the regeneration step.
2. Corrosivity of the amine: Amines can rapidly corrode low alloy steel such as carbon steel. Thus, only amine solutions (in water) with carefully controlled solution strengths are used to minimize corrosion of the absorption column, piping, and pumps. However, this diluted concentration requires higher circulation rates to achieve the desired $CO_2$ removal. High circulation rates require larger process equipment (capital expense), increased reboiler duty (energy/operating expense) and increased pumping costs (energy/operating expense). Inhibitors are also typically used to control corrosion, but are often toxic.
3. $CO_2$ loading capacity: $CO_2$ loading capacity is limited by the concentration (or diluteness) of the amine solution. Also, the regenerated amine solution, although lean in $CO_2$, still contains some absorbed $CO_2$—reducing its capacity and reducing the driving force in the absorber. Thus, the effective, steady-state $CO_2$ removal rate is further lowered. So, higher circulation rates than theoretical are required for removal of $CO_2$ to desired levels. It is not recommended to attempt to boost loading capacity by increasing the amine concentration. This is due to increased corrosion potential effecting the longevity of the equipment. Even if corrosion inhibitors are used, serious viscosity problems can occur when using high concentrations of amines which can lead to hydraulic failures.
4. Degradation of amine: Amines react with $CO_2$ (and $H_2S$, COS, etc.) to form various different products that are not reversible in the regeneration step. Amines may also degrade thermally. The third, well-studied route of amine degradation is oxidatively, but that is mainly for flue-gas applications and not natural gas. Trace impurities like SOX, NOX also degrade amines. As a result, there is a 'reclaimer' used to remove the degradation products from the amine circulation loop. This 'reclaimer' step generates waste products and requires additional energy. Also, regular amine make-up is required to replace the lost amine. Disposal of the degradation products may also be a concern.

Because of the significant costs involved, proper amine selection requires careful evaluation of these factors for the specific application since the criticality of these factors varies for different amines. In other words, one faces a trade-off and optimization between benefits and costs. Nevertheless, in general, the main disadvantage for amine-based $CO_2$ removal processes remains the high energy consumption requirements.

Instead of chemical absorption with amine solutions as was discussed above, physical absorption with physical solvents (e.g., Selexol™, IFPexol™, n-formyl morpholine (NFM)) is another option for $CO_2$ removal. The primary advantage of physical solvents over amine solutions is that lower energy requirements are needed since $CO_2$ absorption is accomplished through physical solubility interactions—not chemical reactions. In fact, unlike the energy-intensive regeneration stripping columns in amine-based chemical absorption processes, $CO_2$ recovery via physical absorption processes use a sequence of flash stages (i.e., successive pressure reductions) to desorb $CO_2$ from the physical solvent. However, physical absorption processes also have several disadvantages:

1. Low $CO_2$ capacity: Physical solvents tend to have lower $CO_2$ capacities than amine solvents. Thus, higher circulation rates and larger equipment is needed. On the other hand, $CO_2$ absorption tends to increase significantly with increasing $CO_2$ concentration or partial pressure. So, physical solvents are most attractive for high-$CO_2$ content gas.
2. Pickup of hydrocarbons: Significant amounts of valuable hydrocarbons are absorbed by physical solvents. For natural gas processing applications, some of these hydrocarbons can be lost in the $CO_2$ waste stream.
3. High circulation rates: Physical solvent processes may require twice the circulation rate as amine solutions. Higher circulation rates result in higher capital and operating expenses. Also, absorber columns using physical solvents typically have more stages of contact and are therefore much taller than those employing amine solutions.
4. Solvent losses: Physical solvents can be entrained and lost to the treated gas. Refrigeration or water-washing may be used to minimize losses but this requires added capital expense and increased operating cost.

Art that relates to the use of Ionic Liquids for separations include U.S. Pat. No. 6,623,659 ('659 patent) entitled Separation of Olefins from Paraffins Using Ionic Liquid Solutions to Munson et al. which provides a method for separating olefins from non-olefins. The '659 patent uses a Group 1B metal salt (preferably a silver salt) dissolved in ionic liquids for separating olefins from non-olefins including paraffins, cycloparaffins, oxygenates, aromatics, and oxygenates. The '659 patent does not relate to the separation of $CO_2$ nor does use the class of ionic liquids used in the method and process of the present invention.

Another publication that discloses a method of separation using ionic liquids is US Patent Application Publication 2003/0125599 to Boudreau et al. Boudreau et al. relates to the separation of dienes form olefins using a Group 1B salt in an ionic liquid solution. The di-olefins or dienes can be selectively complexed by the Group 1B metal salt the separated from the uncomplexed olefins. Boudreau et al. does not discuss separation of $CO_2$ or the use of an ionic liquid comprising a carboxylate moiety.

In light of the limitations of the physical and chemical processes discussed above it would be desirable to have a $CO_2$ removal process with some of the features of the physical absorption processes (namely low energy for regeneration, low solvent losses, minimal corrosion problems) and also have some of the properties of chemical absorption processes (such as high loading capacity and low hydrocarbon co-absorption). The present invention provides a new process with just such desired features.

SUMMARY OF THE INVENTION

The present invention provides a process for removal of $CO_2$ from gaseous streams, comprising:
  contacting a $CO_2$ containing gaseous stream with an absorbent comprising from 1 to 20 wt % water and an ionic liquid comprising a cation and an anion comprising a carboxylate moiety;
  said contacting occurring at absorption conditions, to absorb at least a portion of the $CO_2$ from the $CO_2$ containing gaseous stream and forming a $CO_2$-absorbent complex; and
  recovering a gaseous product having a reduced $CO_2$ content.

In another embodiment of the present invention a method is disclosed of separating $CO_2$ from a hydrocarbon containing gas, comprising:
  a. contacting a gas comprising $CO_2$ and hydrocarbon with an absorbent comprising from 1 to 20 wt % water and an ionic liquid comprising a cation and an anion having a carboxylate function, at absorption conditions, to form a $CO_2$ complex;
  b. recovering an effluent comprising hydrocarbon gas depleted in $CO_2$; and
  c. subjecting the $CO_2$ complex to desorption conditions to form a stream comprising $CO_2$ and a stream comprising recycled absorbent.

In an embodiment of the present invention the ionic liquid absorbent is selected from the group consisting of hmim acetate and bmim acetate. In a preferred embodiment of the invention the ionic liquid absorbent useful in the present invention comprises bmim-acetate.

Among other factors the present invention provides a new process for removing $CO_2$ from hydrocarbon containing gas streams using an ionic liquid absorbent. The new process and method has a unique mix of properties that provide advantages over prior processes. The process of the present invention has a high $CO_2$ capacity, low hydrocarbon solubility (low co-absorption), and requires low energy for regeneration of the ionic liquid absorbent. The unique set of desirable features of the present invention makes it economically advantageous over current commercial physical and chemical absorption systems.

The inventors have further discovered that the presence of water facilitates binding of the $CO_2$ using the absorbents of the present invention. Not to be bound by theory it is believed that the carboxylate moity (such as acetate) interacts with water to form a weak reversible bond with $CO_2$.

BRIEF DESCRIPTION OF THE DRAWINGS

FIG. 2 provides pure $CO_2$ loading curves at 24° C. for various solvents.

DETAILED DESCRIPTION OF THE INVENTION

Figure 1:
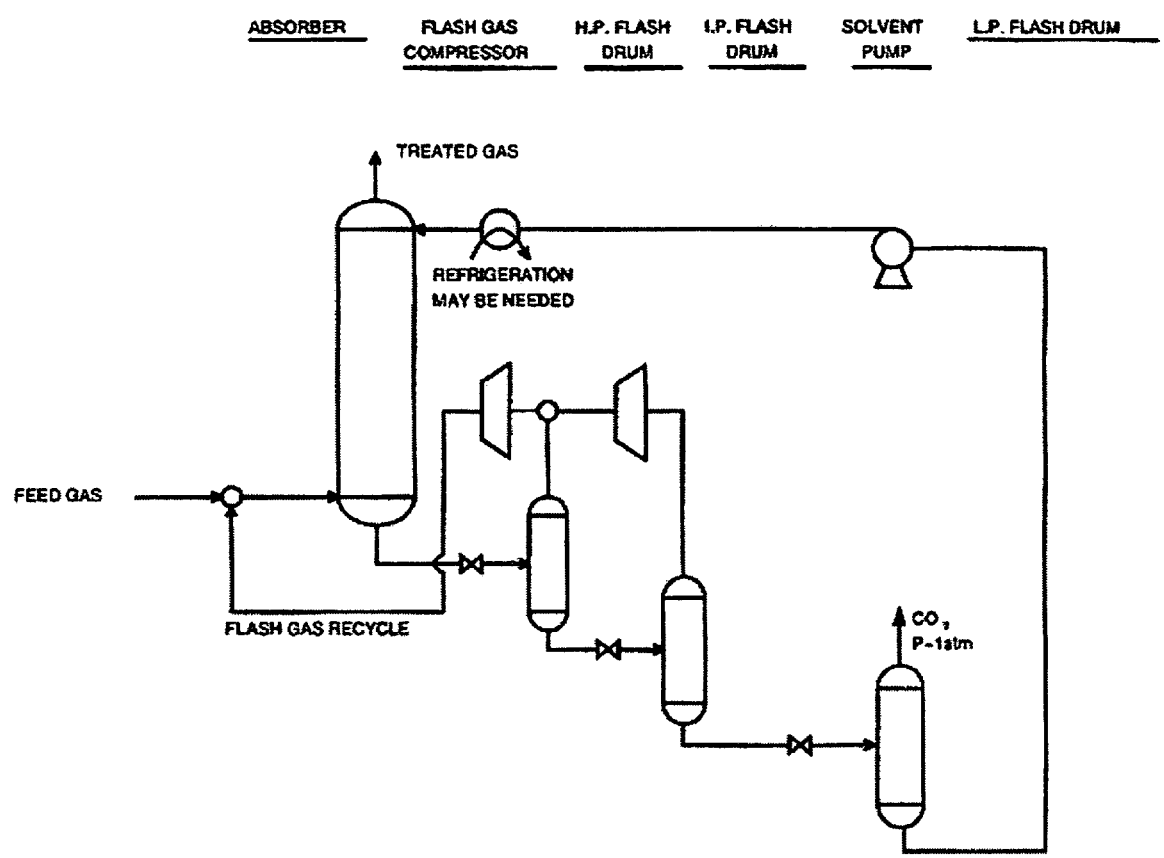
FIG. 1 shows a simple process flow diagram for a physical absorption process for the removal of $CO_2$ from a feed gas that is usable in the process of the present invention. The ionic liquid absorbent of the present invention is used in the absorber.

The present invention provides a novel process for the separation of $CO_2$ from hydrocarbon containing gaseous streams. Surprisingly we have discovered that absorbents containing an ionic liquid having an anion comprising a carboxylate moiety have a particularly useful set of features for separation and or removal of $CO_2$ from a gaseous stream. In particular the present invention provides a process for removal of $CO_2$ from a hydrocarbon containing gas such as natural gas.

Ionic Liquids

Ionic liquids are a category of compounds which are made up entirely of ions and are liquid at or below process temperatures. Often salts which are composed entirely of ions are solids with high melting points, for example, above 450 degrees C. These solids are commonly known as 'molten salts' when heated to above their melting points. An example of a common 'molten salt' is NaCl, with a melting point of 800 degree C. Ionic liquids differ from 'molten salts', in that they have low melting points, for example, from −100 degrees C. to 200 degree C. They tend to be liquid over a very wide temperature range, with a liquid range of up to about 500 degrees C. or higher. Ionic liquids are generally non-volatile, with effectively no vapor pressure. Many are air and water stable, and can be good solvents for a wide variety of inorganic, organic, and polymeric materials.

The properties of ionic liquids can be tailored by varying the cation and anion pairing. Ionic liquids and their commercial applications are described, for example, in J. Chem. Tech. Biotechnol, 68:351-356 (1997); J. Phys. Condensed Matter, 5:(supp 34B):B99-B106 (1993); Chemical and Engineering News, Mar. 30, 1998, 32-37; J. Mater. Chem., *:2627-2636 (1998); and Chem. Rev., 99:2071-2084 (1999), the contents of which are hereby incorporated by reference.

Many ionic liquids are formed by reacting a nitrogen-containing heterocyclic ring, preferably a heteroaromatic ring, with an alkylating-agent (for example, an alkyl halide) to form a quaternary ammonium salt, and performing ion exchange or other suitable reactions with various Lewis acids or their conjugate bases to form ionic liquids. Examples of suitable heteroaromatic rings include pyridine, substituted pyridines, imidazole, substituted imidazoles, pyrrole and substituted pyrroles. These rings can be alkylated with virtually any straight, branched or cyclic $C_{1-20}$ alkyl group, but preferably the alkyl groups are $C_{1-12}$ groups, since groups larger than this tend to produce low melting solids rather than ionic liquids. Various quaternary phosphonium compounds, thioethers, and cyclic and non-cyclic quaternary ammonium salts have also been used.

Counterions which have been used include chloroaluminate, bromoaluminate, gallium chloride, tetrafluoroborate, tetrachloroborate, hexafluorophosphate, nitrate, trifluoromethane sulfonate, methylsulfonate, p-toluenesulfonate, hexafluoroantimonate, hexafluoroarsenate, tetrachloroaluminate, tetrabromoaluminate, perchlorate, hydroxide anion, copper dichloride anion, iron trichloride anion, antimony hexafluoride, copper dichloride anion, zinc trichloride anion, as well as various lanthanum, potassium, lithium, nickel, cobalt, manganese, and other metal ions. The ionic liquids can be neutral, basic or acidic.

Preferred anions having a carboxylate moiety (or carboxylic functionality) are acetates or acetate analogs such as propionate, butyrate, etc. Any anion that contains a carboxylate function, carboxylic function or carboxylate moiety may be useful in the present invention. In the present application the term carboxylate is used to mean a group having the chemical formula of —COO⁻ where the two oxygen atoms are attached to the carbon atom. The carbon oxygen attachment may be in the form of a carbonyl.

The form of the cation in the ionic liquid absorbent is not thought to be as critical as the anion in the present invention however cations that have been found to be particularly useful in the process of the present invention include 1-butyl-3-methylimidazolium (bmim) and 1-hexyl-3-methylimidazolium (hmim). In a preferred embodiment of the present invention the ionic liquid should have a pure $CO_2$ loading curve at 24 degrees C. between that of MEA (85% $H_2O$) and Selexol when plotted in the same manner as FIG. 2. FIG. 2 plots Solvent Loading ($cm^3$ STP $CO_2/cm^3$ solvent) vs Equilibrium Partial Pressure $CO_2$ (atm) for a number of physical and chemical solvents.

In an alternative embodiment of the present invention the cation may comprise a carboxylate moiety. This may be in addition to the anion's carboxylate function or may be in place of having an anion having a carboxylate moiety.

In still another embodiment of the present invention the ionic liquid can have a multitude of carboxylate functions. The carboxylate functions can be part of the anion, part of the cation or both on the cation and anion. Examples of anions having a multitude of carboxylate functions include but are not limited to oxalates, malonates, succinates, citraconates, citrates, etc.

As discussed above the inventors have further discovered that the presence of water facilitates binding of the $CO_2$ using the absorbents of the present invention. Not to be bound by theory it is believed that the carboxylate moity (such as acetate) interacts with water to form a weak reversible bond with $CO_2$.

In the present invention the water content of the absorbent should be from 0.1 to 25 wt. %, preferably 1 to 20 wt. %, more preferably 5 to 20 wt. %, still more preferably 8 to 18 wt. %, most preferably 10 to 15 wt %.

The potential benefits of this material and process are:
  Comparable or higher $CO_2$ loading capacity than amines and physical solvents
  Lower energy requirements for the regeneration of the ionic liquid
  Lower absorption or pickup of hydrocarbons
  More chemically stable than amines: No degradation byproducts and disposal issues
  Non- or less-corrosive than amines: Pure ionic liquids or high concentrations can be used to lower circulation rates significantly, minimizing process equipment size and maintenance/operating costs In one embodiment of the present invention a process employing ionic liquids for $CO_2$ scrubbing is shown in FIG. 1. Instead of a regenerator column such as used in amine plants, a flash regeneration process in one or several stages is used. In a $CO_2$ absorption step, regenerated (or lean) ionic liquid is contacted countercurrently with a feed gas in the absorber column. $CO_2$ is absorbed from the gas into the ionic liquid. The $CO_2$-rich ionic liquid goes through one or several high-pressure flash stages to recover absorbed hydrocarbons that are compressed and recycled back to the feed to the contactor. Absorbed $CO_2$ is removed and the ionic liquid is regenerated in the final flash step at atmospheric pressure. Regenerated or lean ionic liquid is pumped back to the absorber column.

The process scheme shown in FIG. 1 is similar to that commonly used for physical absorption processes. The flash regeneration process is advantageous because it requires significantly lower energy requirements than the high-temperature stripping column required for amine-based processes. Such a process is possible because $CO_2$ more easily removed from the ionic liquid than from amine solutions. Ionic liquids are also more attractive than physical solvents because of their higher $CO_2$ loading capacities than those of physical solvents, requiring lower circulation rates and smaller sizing of the process equipment. Additionally, ionic liquids exhibit very low hydrocarbon absorption and pickup in comparison to physical solvents, minimizing the need for the intermediate flash and compression stages and also minimizing the loss of valuable hydrocarbons in the $CO_2$ waste stream.

In an alternative embodiment of the present invention the ionic liquid solvent of the present invention may be used in chemical solvent process. In such a process, $CO_2$ is desorbed from the ionic liquid in a regenerator column by means of a suitable stripping gas (e.g., live steam, nitrogen). The practitioners skilled in the art will select the temperature, pressure, and composition of the stripping gas to maximize the efficiency of $CO_2$ recovery for a given application.

An additional advantage of the process and method of the present invention is that losses of the ionic liquid absorbent are very low. Ionic liquid absorbents such as a preferred absorbent bmim-acetate have very low (effectively zero) vapor pressure. Thus the potential for the IL absorbent being lost in the gaseous product is minimal. The bmim-acetate used in the process and method of the present invention was obtained from SACHEM™. Ionic liquids such as [bmim] [acetate] (or bmim-acetate) can be made using preparations available in the open literature. In the case of [bmim][acetate], it can be made by reacting bmim-chloride with an appropriate acetate salt or acetic acid. In a like manner many other Ionic liquids may be made having a carboxylate function by selecting the appropriate cation-chloride and reacting it with the desired anion salt or acid form of the anion. More details on the synthesis of ionic liquids can be found in the previously cited review article by Thomas Welton: Chem. Rev., 99:2071-2084 (1999).

Ionic liquids useful in the method and process of the present invention are also quite chemically stable. Losses of the IL through degradation to form byproducts is also minimal. In a preferred embodiment of the process and method of the present invention virtually all of the ionic liquid can be recycled and reused.

EXAMPLES

Example 1

Experimental Methods

This example shows the procedures used for generating loading curves shown in FIG. 2. All of the ionic liquids ([bmim][acetate], [bmim][BF$_4$]) and physical solvents (e.g., NAM, NFM) were used as-received. The water content for each solvent, as determined by Karl-Fischer titration, is summarized below:

| | | |
|---|---|---|
| [bmim][acetate]: | 14.0 wt. % | H$_2$O |
| [bmim][BF$_4$]: | 0.21 wt. % | H$_2$O |
| NAM: | 0.15 wt. % | H$_2$O |
| NFM: | 0.28 wt. % | H$_2$O |

The aqueous amine solvents were prepared by diluting the pure amine with the appropriate amount of water. The amine concentrations were chosen to match those that are commonly used in the gas processing and refining industries (50 wt. % MDEA, 30 wt. % MEA, etc.).

Gas sorption measurements were conducted with a static, volumetric method. A known mass (2 to 4 grams) of solvent was added to a clean, pressure vessel of known volume (~25 cm$^3$). The sample vessels are all equipped with a relief valve, inlet sampling plug valve, and a digital pressure gauge. After zeroing the gauge, the vessel was quickly pressurized with the desired gas up to the desired pressure (30 to 150 psig). After recording the initial pressure, the sample vessel was placed on a reciprocating shaker bath at room temperature. As the gas inside the vessel absorbs into the solvent, the pressure gradually decreases until equilibrium was attained. In early experiments, the pressure was recorded after 1, 2, 4, 6, 8, 12, and 24 hours. Our observation was that pressure remains stable after 2-hours of agitation. After recording the final pressure, the sample vessel was heated using heating tape to a higher temperature (50 to 80° C.) and placed onto the reciprocating shaker bath. The pressure in the vessel was observed to increase as the gas desorbs from the solvent and accumulate in the head space. Eventually, a new equilibrium pressure was reached at the higher temperature. The experiments were then repeated for different initial gas pressures and final temperatures in order to generate a series of loading curves for each solvent.

Example 2

CO$_2$ Loading Curves in Solvents

Gas loadings (cm$^3$ STP/cm$^3$ liquid) were calculated using the ideal gas law from the initial and equilibrium gas pressures, temperature, solvent volume, and vessel volume. The presence of air and water vapor in the gas phase must be accounted for when applying this method, especially for the high-temperature data.

FIG. 2 shows the room-temperature, pure CO$_2$ loading curves for several solvents. CO$_2$ loadings are reported on a volumetric basis (cm$^3$ STP CO$_2$/cm$^3$ solvent) to account for any differences in densities between the solvents. Several clear trends can be seen in the data.

The aqueous amines (1-3) all had the highest volumetric CO$_2$ loadings over the entire pressure range, and have curves that rise steeply initially and then plateaus at higher pressures. This is characteristic of chemical absorption ("chemisorption"), which is expected because it is well-known that amine groups can reversibly bind CO$_2$ either as a carbamate species (with MEA) or bicarbonate species (MDEA and MEA).

The physical solvents (6-10) all have low volumetric CO$_2$ loadings, and have linear loading curves over the entire pressure range. This is characteristic of physical absorption, where CO$_2$ is physically dissolved into the liquid without any specific, chemical forces.

The ionic liquids are interesting in that depending on their anion group, the solvent can behave more closely as a chemical solvent (4) or a physical solvent (5). [bmim][acetate] shows CO$_2$ loadings that are intermediate between the aqueous amines and physical solvents. Without being bound to any specific theory, we suspect that the acetate group interacts with water to form a weak, reversible bond with CO$_2$. One possibility is that the CO$_2$ binds as a bicarbonate group to [bmim][acetate]. This chemistry is not possible in the case of [bmim][BF$_4$]. In fact, the CO$_2$ loading curve of this ionic liquid is slightly higher than pure water.

Example 3

CO$_2$ Loading Curves in "Hybrid" Ionic Liquids

Figure 3:
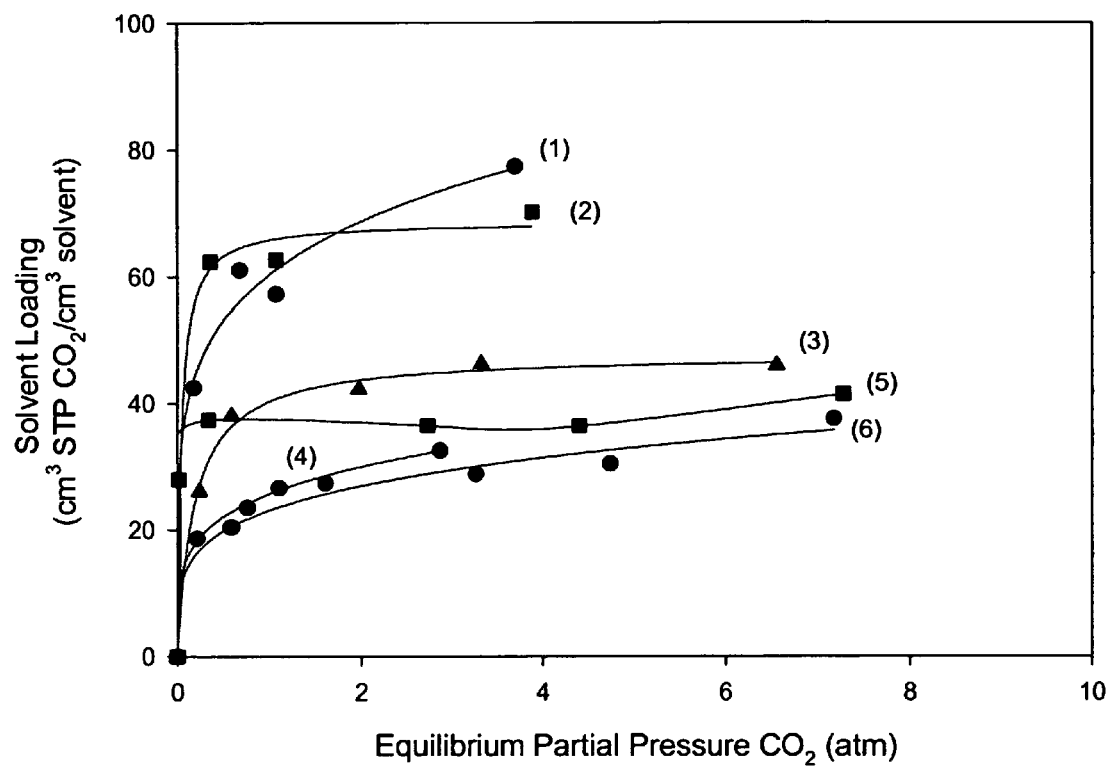
FIG. 3 shows pure $CO_2$ loading curves (24° C.), comparing "hybrid" ionic liquids with aqueous amines and [bmim][acetate].

Experiments were performed to investigate the effect of blending pure amines with [bmim][acetate]. FIG. 3 shows the room-temperature CO$_2$ loading curves for the aqueous amines (1-3), [bmim][acetate] (4), and two different amine blends of [bmim][acetate] (5-6). The MDEA-[bmim][acetate] blend behaved similar to that of pure [bmim][acetate]. This is consistent with the notion that both MDEA and [bmim][acetate] bind CO$_2$, in the presence of water, as a bicarbonate species. However, when the amine was changed from MDEA to MEA, we see that the blend has the highest observed CO$_2$ loading curve among all ionic liquids. With MEA, CO$_2$ is able to bind directly as a carbamate species at a 2:1 ratio of MEA:CO$_2$. At higher partial pressures, CO$_2$ can also bind as bicarbonate species under the influence of the [acetate] functionality. Because of these different mechanisms, the MEA-[bmim][acetate] loading curve has a peculiar shape. The aqueous amines (1-3) however, still have higher overall CO$_2$ loading curves that the ionic-liquid blends.

Example 4

CH$_4$ and C$_3$H$_8$ Loading Curves in Solvents

Figure 4:
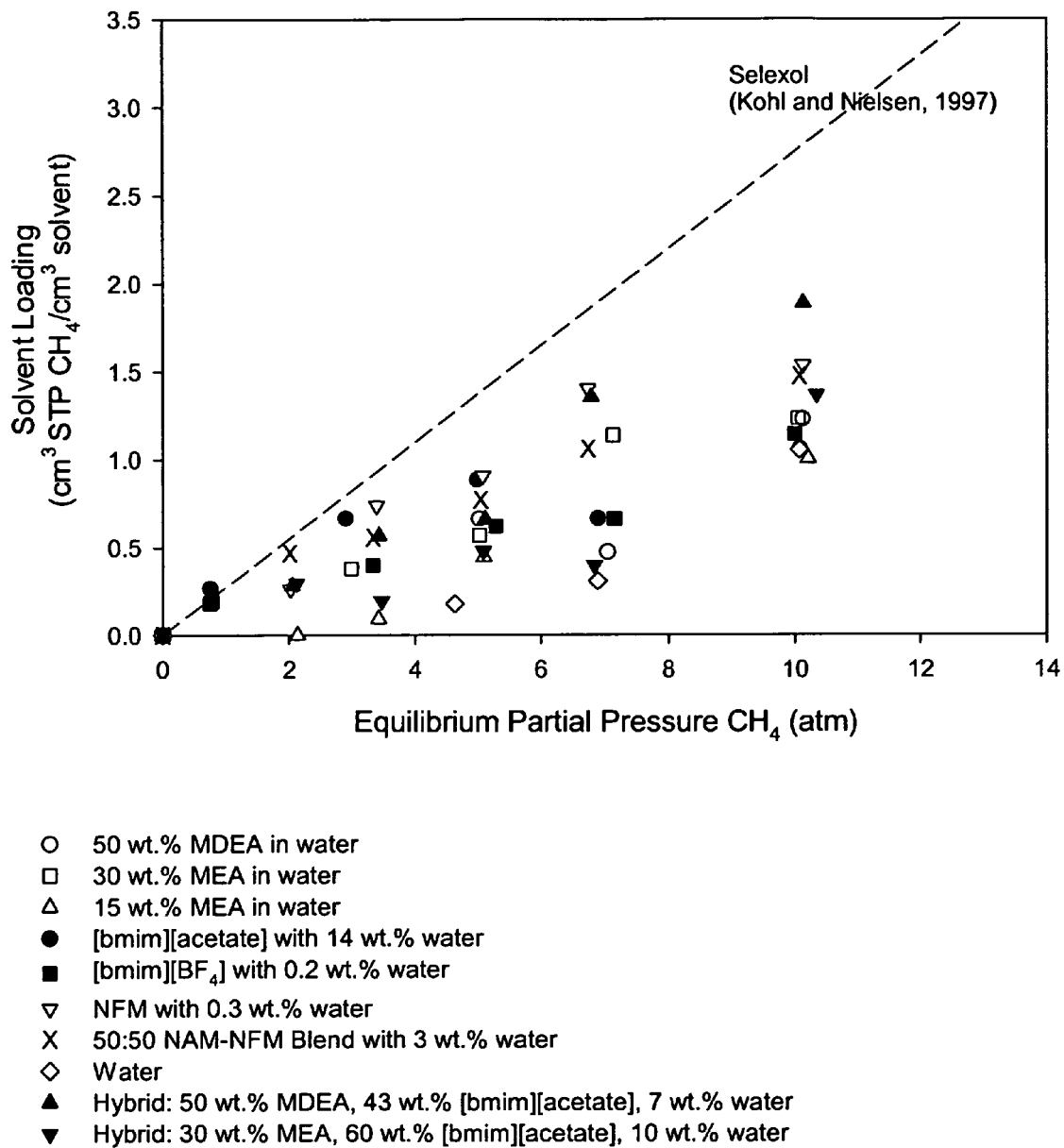
FIG. 4 provides pure $CH_4$ loading curves (24° C.) for various solvents.
Figure 5:
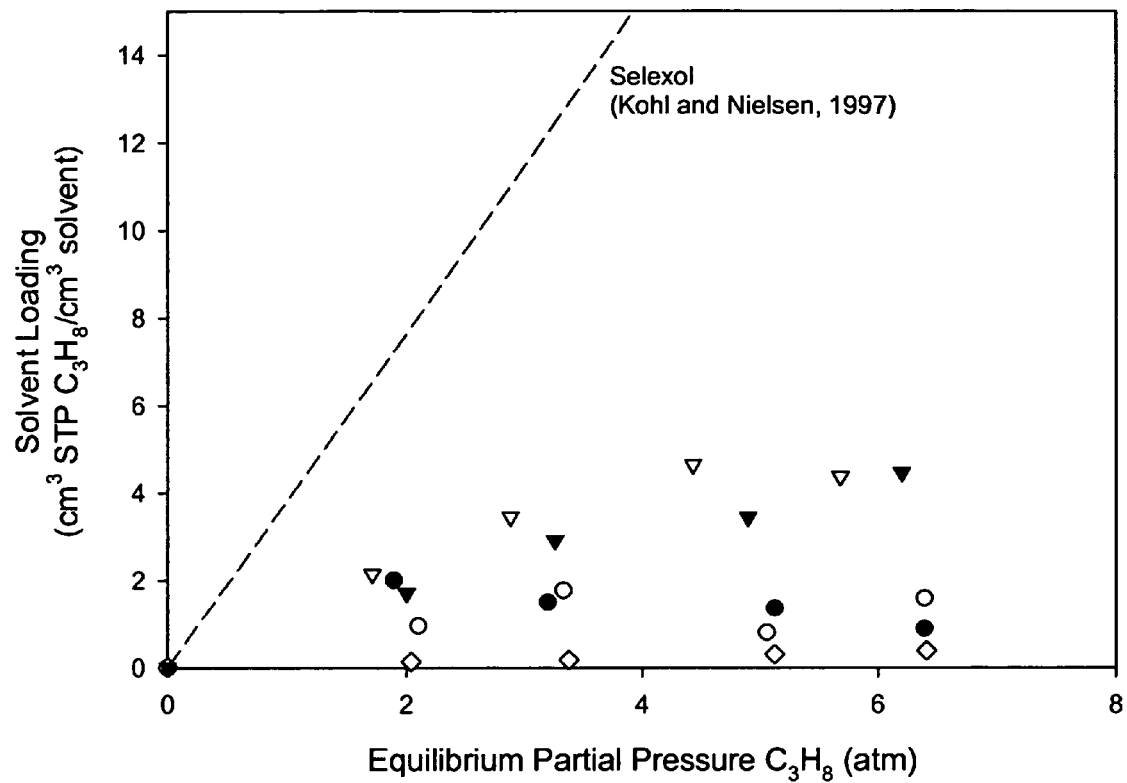
FIG. 5 provides pure $C_3H_8$ loading curves (24° C.) for various solvents.

Hydrocarbon co-absorption in solvents is sometimes a concern, especially when physical solvents are used and/or operating at high feed pressures. FIG. 4 shows the room-temperature loading curves for CH$_4$, while FIG. 5 shows the room-temperature loading curves for C$_3$H$_8$. There is considerably more scatter in the data due to the relatively small amount of hydrocarbon sorption (i.e., there is a small difference between the experimental initial and final pressure readings). Compared to CO$_2$, the volumetric amount of hydrocarbon absorbed can be 10 to 20-times lower at a given equilibrium pressure. In both figures, the published loading curve for the commercial solvent, SELEXOL™ was plotted as a reference. All of the solvents tested in this work showed similar or lower CH$_4$ loadings, and substantially lower C$_3$H$_8$ loadings than SELEXOL™.

Example 5

CO$_2$ Heats of Sorption

The energy requirement for regeneration is another important consideration in selecting a CO$_2$-removal solvent. Normally, the chemical solvents have the highest volumetric capacities for CO$_2$ along with the highest energy requirements. The opposite is usually true for the physical solvents. One commonly-used parameter to assess the regeneration energy requirements is the isosteric heat of sorption:

$$\Delta H_{CO2} = R \left( \frac{\partial \ln P}{\partial (1/T)} \right)_{X_{CO2}}$$

Where $\Delta H_{CO2}$ is the heat of absorption (kJ/mol) at a given CO$_2$ liquid loading, $X_{CO2}$ (mol CO$_2$/mol liquid). P (atm) and T(K) are absolute pressure and temperatures, respectively and R is the gas constant, $8.314 \times 10^{-3}$ kJ/mol*K. $\Delta H_{CO2}$ will be negative in most cases (indicating that absorption is exothermic), and will gradually decrease as the liquid loading, $X_{CO2}$ increases. For linear loading curves, as with most physical solvents, $\Delta H_{CO2}$ will be constant. $\Delta H_{CO2}$ is easily calculated by measuring the loading curves for CO$_2$ at two or more different temperatures, and re-plotting the data as $P_{CO2}$ vs. $X_{CO2}$. For our work, an "average" $\Delta H_{CO2}$, measured over the range of liquid loadings were reported for each solvent.

Figure 6:
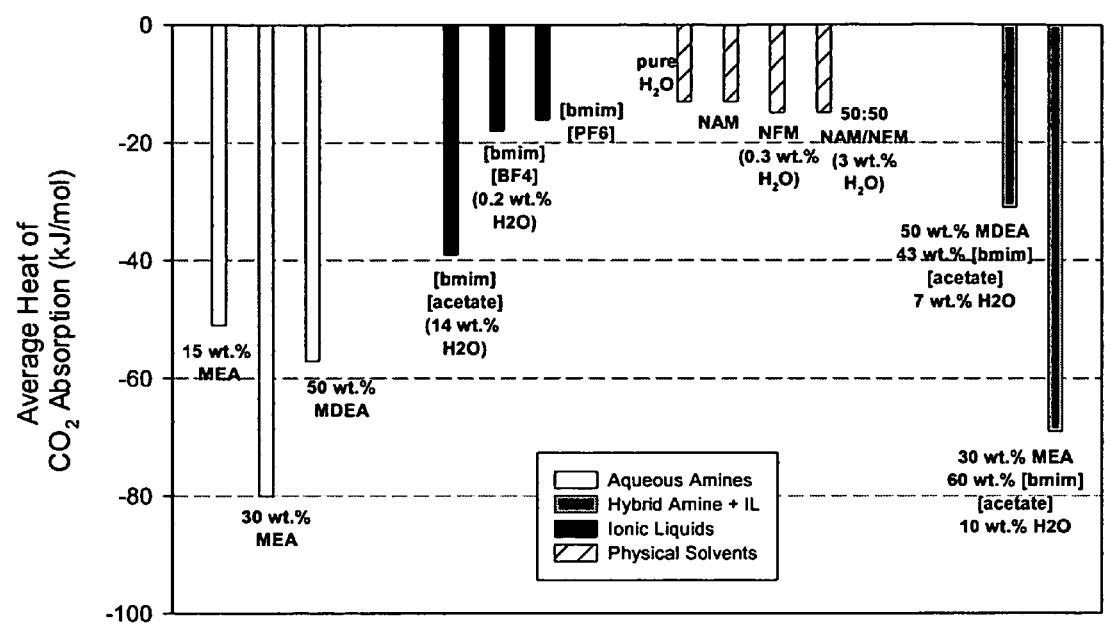
FIG. 6 shows calculated average Heats of Sorption for $CO_2$ in several solvents. Literature values were used for the following solvents:
  30 wt. % MEA and 50 wt. % MDEA: (Rochelle, G. T. et al. Report to DOE No. DE-AF26-99FT01029. September 2000.)
  NAM: (Gross M. et al., 1999 Laurance Reid Gas Conditioning Conference Paper.)
  Pure water and [bmim][$PF_6$]: (Anthony, J. L. et al., J. Phys. Chem. B 2002, 106, 7315-7320.)
Figure 7:
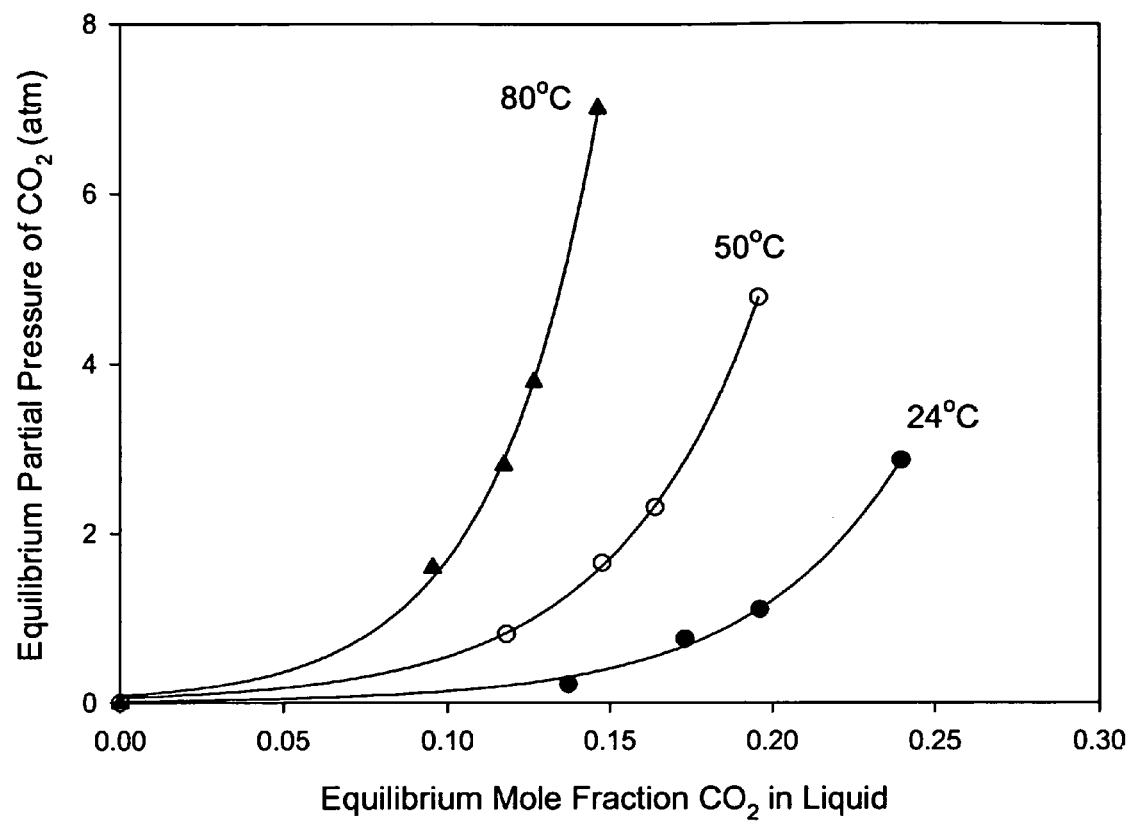
FIG. 7 shows the effect of temperature on $CO_2$ solubility in [bmim][acetate]. The solvent was used as-received, and contains 14 wt. % water.
Figure 8:
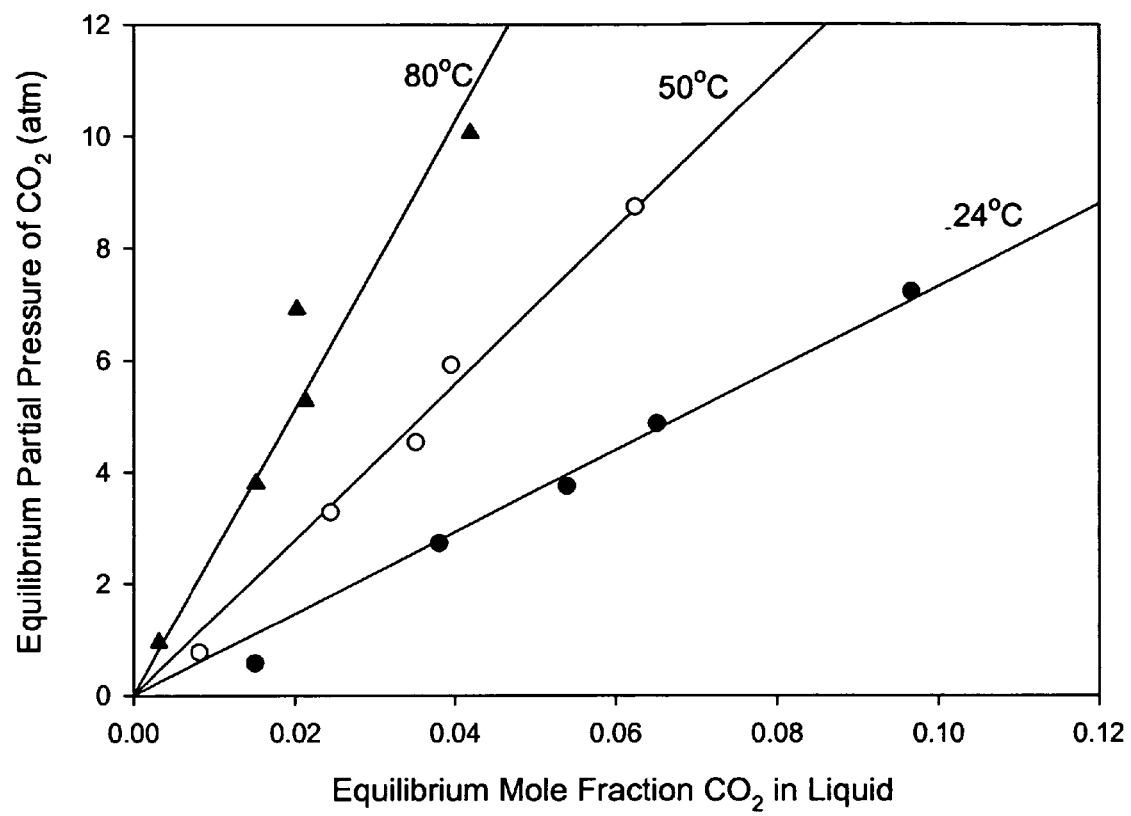
FIG. 8 demonstrates the effect of temperature on $CO_2$ solubility in [bmim][$BF_4$]. The solvent was used as-received, and contains 0.2 wt. % water.
Figure 9:
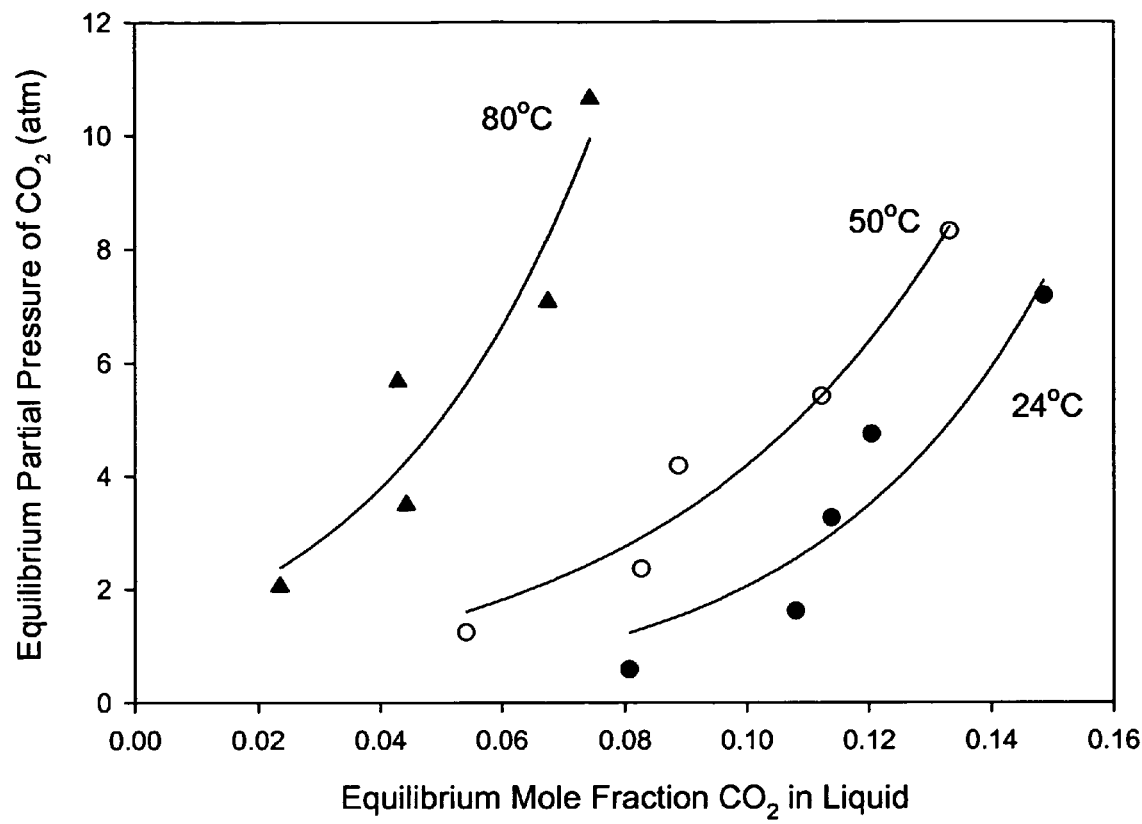
FIG. 9 shows the impact of temperature on $CO_2$ solubility in the hybrid solvent, 50 wt. % MDEA, 43 wt. % [bmim][acetate], and 7 wt. % water.
Figure 10:
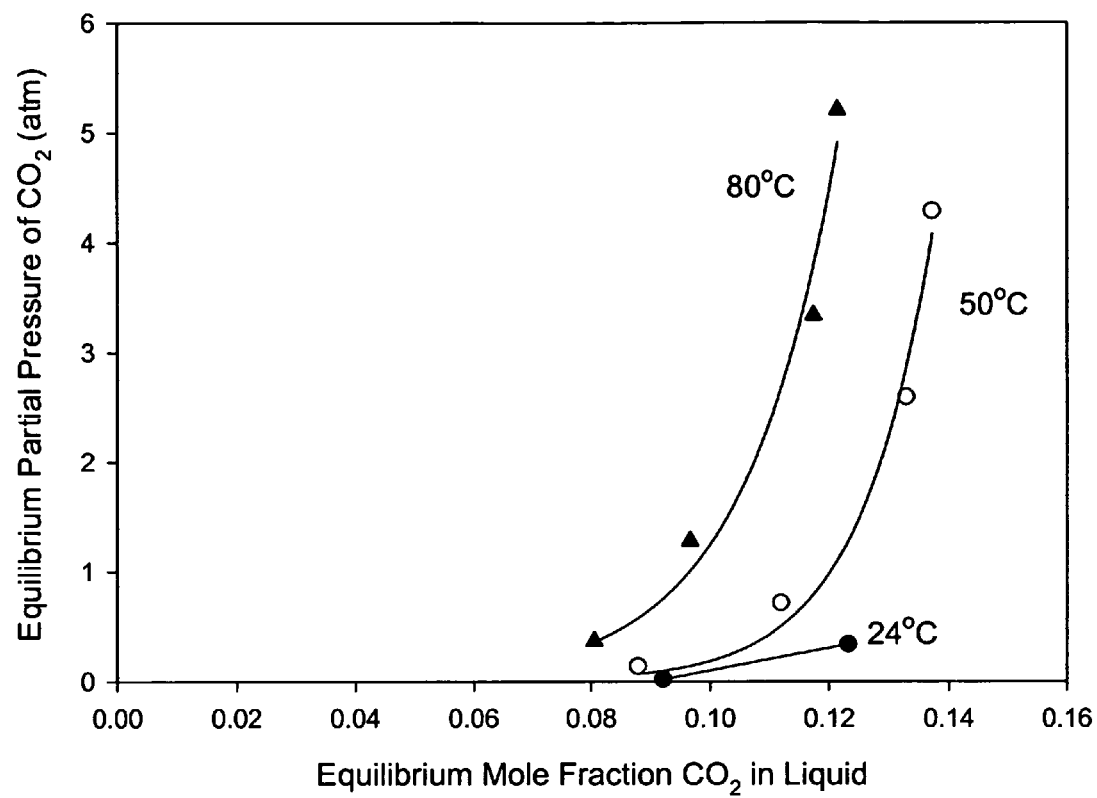
FIG. 10 demonstrates the effect of temperature on $CO_2$ solubility in the hybrid solvent, 30 wt. % MEA, 60 wt. % [bmim][acetate], and 10 wt. % water. The temperatures used are 24, 50, and 80° C.

FIG. 6 summarizes the $\Delta H_{CO2}$ (kJ/mol) values for all of the solvents tested in our work along with others reported in the literature. For some of the better known, MEA, MDEA, and NAM systems, we relied on literature values. The physical solvents (water, NAM, NFM) all had the lowest absolute $\Delta H_{CO2}$, with values under −20 kJ/mol. The aqueous amines have the highest absolute $\Delta H_{CO2}$, ranging from −50 to −80 kJ/mol. As expected, the ionic liquids all fall in between the two, depending on the anion group. When the anion is [BF$_4$] or [PF$_6$], the ionic liquid behaves as a physical solvent. With [acetate] as the anion, the ionic liquid behaves more closely like a chemical solvent. However, we observed that [bmim][acetate] has a $\Delta H_{CO2}$=−40 kJ/mol, which is lower in absolute value than the weakest amine, 15 wt. % MEA which has −50 kJ/mol. The trends observed in the hybrid amine-ionic liquids were also consistent. The enhanced CO$_2$ capacity of MEA-[bmim][acetate] upon adding the amine functionality came at the expense of a much more exothermic $\Delta H_{CO2}$. In contrast, adding MDEA to [bmim][acetate] did very little, and the $\Delta H_{CO2}$ and CO$_2$ loadings were similar to that of [bmim][acetate] alone.

Example 6

CO$_2$ Loading Curves at Higher Temperatures

FIG. 7 through FIG. 10 summarize the loading curves at 24, 50, and 80° C. for pure and amine-blended ionic liquids. The data was plotted as $P_{CO2}$(atm) vs. $X_{CO2}$(mol/mol), from which $\Delta H_{CO2}$ may readily be determined. The loading curve for [bmim][BF$_4$] was linear at each temperature (i.e., characteristic of Henry's Law), as expected for a physical solvent. In contrast, [bmim][acetate] and the amine-[bmim][acetate] hybrids all exhibited strong curvature in their loading curves.

What is claimed is:

1. A process for removal of CO$_2$ from gaseous streams, comprising:
    contacting a CO$_2$ containing gaseous stream with an absorbent comprising from 1 to 20 wt % water and an ionic liquid comprising a cation and an anion comprising a carboxylate moiety;
    said contacting occurring at absorption conditions, to absorb at least a portion of the CO$_2$ from the CO$_2$ containing gaseous stream and forming a CO$_2$-absorbent complex; and
    recovering a gaseous product having a reduced CO$_2$ content.

2. The process of claim 1 wherein at least a portion of the CO$_2$-absorbent complex is subjected to desorption conditions to form a CO$_2$ effluent and a stream comprising recovered absorbent.

3. The process of claim 1 wherein the cation is selected from the group consisting of imidazoliums and pyridiniums.

4. The process of claim 3 wherein the cation is selected from the group consisting of bmim and hmim.

5. The process of claim 1 wherein the anion is selected from the group consisting of acetate, propionate, substituted acetate, and substituted propionate.

6. The process of claim 5 wherein the anion is acetate.

7. The process of claim 1 wherein the CO$_2$ containing gaseous stream is natural gas.

8. The process of claim 1 wherein the absorbent comprises bmim acetate.

9. The process of claim 8 wherein the absorbent comprises 5 to 20% water.

10. The process of claim 6 wherein the absorbent comprises 8 to 18% water.

11. A method of separating CO$_2$ from a hydrocarbon containing gas, comprising:
    a. contacting a gas comprising CO$_2$ and hydrocarbon with an absorbent comprising from 1 to 20 wt % water and an ionic liquid comprising a cation and an anion having a carboxylate function, at absorption conditions, to form a CO$_2$ complex;
    b. recovering an effluent comprising hydrocarbon gas depleted in CO$_2$; and
    c. subjecting the CO$_2$ complex to desorption conditions to form a stream comprising CO$_2$ and a stream comprising recycled absorbent.

12. The method of claim 11 wherein the cation is selected from the group consisting of imidazoliums and pyridiniums.

13. The method of claim 12 wherein the cation is selected from the group consisting of bmim and hmim.

14. The method of claim 11 wherein the anion is selected from the group consisting of acetate, propionate, substituted acetate, and substituted propionate.

15. The method of claim 14 wherein the anion is acetate.

16. The method of claim 11 wherein the $CO_2$ containing gaseous stream is natural gas.

17. The method of claim 11 wherein the absorbent comprises bmim acetate.

18. The method of claim 11 wherein the absorbent comprises 5 to 20 weight % water.

19. The method of claim 15 wherein the absorbent comprises 8 to 18 weight % water.

20. The method of claim 17 wherein the absorbent comprises 8 to 18 weight % water.

* * * * *